(12) United States Patent
Darrer et al.

(10) Patent No.: US 11,662,443 B2
(45) Date of Patent: May 30, 2023

(54) METHOD AND APPARATUS FOR DETERMINING MALFUNCTION, AND SENSOR SYSTEM

(71) Applicant: Infineon Technologies AG, Neubiberg (DE)

(72) Inventors: Franz Michael Darrer, Graz (AT); Martin Graefling, Graz (AT); Boris Kirillov, Judendorf-Straßenge (AT); Stefan Mendel, Graz (AT); Christoph Steiner, St. Margarethen (AT)

(73) Assignee: Infineon Technologies AG, Neubiberg (DE)

( * ) Notice: Subject to any disclaimer, the term of this patent is extended or adjusted under 35 U.S.C. 154(b) by 254 days.

(21) Appl. No.: 16/910,588

(22) Filed: Jun. 24, 2020

(65) Prior Publication Data
US 2021/0041539 A1 Feb. 11, 2021

(30) Foreign Application Priority Data
Aug. 7, 2019 (DE) ...................... 10 2019 121 340.1

(51) Int. Cl.
| | | |
|---|---|---|
| *G01S 7/4863* | (2020.01) | |
| *G01S 7/4865* | (2020.01) | |
| *G01S 17/894* | (2020.01) | |
| *G01S 7/481* | (2006.01) | |
| *G01S 7/497* | (2006.01) | |

(52) U.S. Cl.
CPC ............ *G01S 7/4863* (2013.01); *G01S 7/481* (2013.01); *G01S 7/4865* (2013.01); *G01S 7/497* (2013.01); *G01S 17/894* (2020.01)

(58) Field of Classification Search
CPC ............................... G01S 17/894; G01S 17/86
See application file for complete search history.

(56) References Cited

U.S. PATENT DOCUMENTS

| | | | |
|---|---|---|---|
| 10,469,823 B2 | 11/2019 | Takahashi et al. | |
| 10,916,035 B1* | 2/2021 | Kroeger | .................... G06T 7/80 |
| 2015/0206003 A1* | 7/2015 | Haker | ...................... G06T 19/20 |
| | | | 345/420 |
| 2016/0086318 A1* | 3/2016 | Hannuksela | ............ G01S 17/86 |
| | | | 348/43 |
| 2018/0059225 A1* | 3/2018 | Zhu | ........................ G01S 7/4865 |

(Continued)

FOREIGN PATENT DOCUMENTS

| | | |
|---|---|---|
| DE | 102018002659 A1 | 10/2018 |
| JP | 2014070936 A * | 4/2014 |

OTHER PUBLICATIONS

Translation of JP 2014-070936. (Year: 2014).*

*Primary Examiner* — Thanh Luu
(74) *Attorney, Agent, or Firm* — Harrity & Harrity, LLP

(57) ABSTRACT

A method for determining malfunction is provided. The method includes receiving a 1D or 2D luminance image of a scene from a time-of-flight based 3D-camera. The luminance image includes one or more pixels representing intensities of background light received by an image sensor of the 3D-camera. The method further includes receiving a 2D optical image of the scene from an optical 2D-camera and comparing the luminance image to the optical image. If the luminance image does not match the optical image, the method additionally includes determining malfunction of one of the 3D-camera and the 2D-camera.

19 Claims, 8 Drawing Sheets

(56) References Cited

U.S. PATENT DOCUMENTS

| 2019/0149813 A1* | 5/2019 | Sun | G03B 43/00 |
| | | | 348/187 |
| 2020/0371236 A1* | 11/2020 | Mizuno | G01S 7/4865 |

* cited by examiner

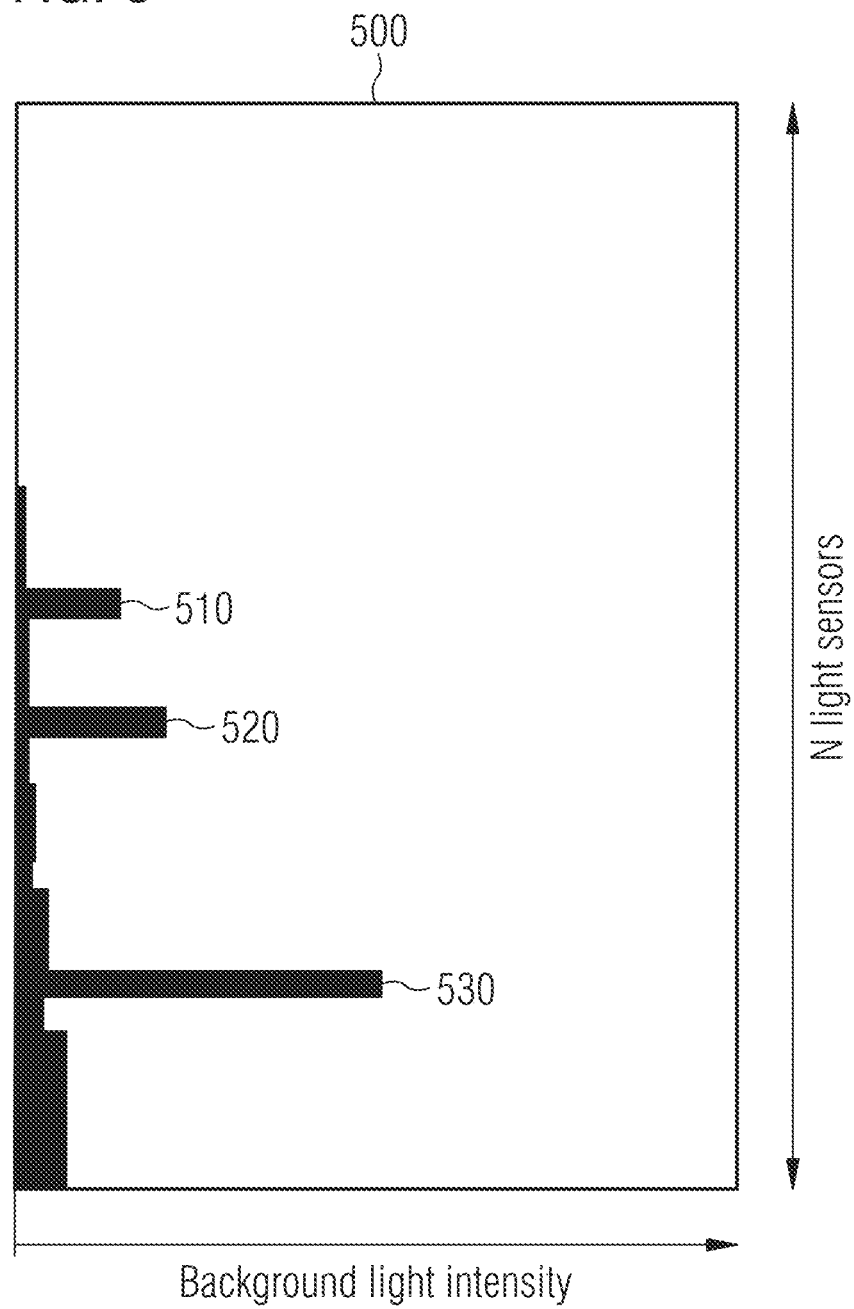

METHOD AND APPARATUS FOR DETERMINING MALFUNCTION, AND SENSOR SYSTEM

RELATED APPLICATION

This application claims priority to German Patent Application No. 102019121340.1, filed on Aug. 7, 2019, which is incorporated herein by reference in its entirety.

FIELD

The present disclosure relates to functional safety of sensor systems using Time-of-Flight (ToF) based three-dimensional (3D)-cameras and optical two-dimensional (2D)-cameras. In particular, examples relate to a method and an apparatus for determining malfunction. Further, examples relate to a sensor system.

BACKGROUND

In ToF based systems like Light Detection And Ranging (LiDAR) or 3D imaging, light is converted into an electrical signal. The electrical signal is then processed with certain parameters and converted into the digital domain. The time from emitting laser light from the LiDAR system to an object to receiving the light reflected from the object is used to generate a 3D image. The digital 3D image then undergoes image post-processing.

During development of systems compliant to functional safety standards such as, e.g., ISO 26262 of the International Organization for Standardization (ISO), it is required to detect and control random hardware faults. The electrical domain of ToF based systems may be covered by conventional safety mechanisms.

However, for the light to electrical signal conversion, which includes, e.g., the pixel matrix, the package including the glass lid and the optics, there is no straightforward approach available for detecting random hardware faults.

Also, optical 2D cameras demand for random hardware fault detection.

SUMMARY

Hence, there may be a demand for detecting malfunction of ToF based 3D-cameras and optical 2D-cameras.

The demand may be satisfied by the subject matter of the appended claims.

An example relates to a method for determining malfunction. The method comprises receiving a 1D or 2D luminance image of a scene from a ToF based 3D-camera. The luminance image comprises one or more pixels representing intensities of background light received by an image sensor of the 3D-camera. The method further comprises receiving a 2D optical image of the scene from an optical 2D-camera and comparing the luminance image to the optical image. If the luminance image does not match the optical image, the method additionally comprises determining malfunction of one of the 3D-camera and the 2D-camera.

Another example relates to an apparatus for determining malfunction. The apparatus comprises a first input interface configured to receive a 1D or 2D luminance image of a scene from a ToF based 3D-camera. The luminance image comprises one or more pixels representing intensities of background light received by an image sensor of the 3D-camera. The apparatus further comprises a second input interface configured to receive a 2D optical image of the scene from an optical 2D-camera. Additionally, the apparatus comprises a processing circuit configured to compare the luminance image to the optical image, and to determine malfunction of one of the 3D-camera and the 2D-camera if the luminance image does not match the optical image.

A further example relates to a sensor system. The sensor system comprises a ToF based 3D-camera and an optical 2D-camera. Further, the sensor system comprises an apparatus for determining malfunction as described herein. The sensor system additionally comprises an apparatus for fusing images of the 3D-camera and the 2D-camera. The apparatus for fusing images of the 3D-camera and the 2D-camera comprises a first input interface configured to receive a 3D image of the scene from the 3D-camera and a second input interface configured to receive the 2D optical image of the scene from the 2D-camera. Additionally, the apparatus for fusing images of the 3D-camera and the 2D-camera comprises a processing circuit configured to fuse the 3D image and the 2D optical image to a combined image of the scene.

BRIEF DESCRIPTION OF THE DRAWINGS

Some examples of apparatuses and/or methods will be described in the following by way of example only, and with reference to the accompanying figures, in which

FIGS. 2-1 and 2-2 which make up FIG. 2 illustrates an example of a sensor system;

FIGS. 4-1 and 4-2 which make up FIG. 4 illustrates another example of a sensor system;

FIG. 5 illustrates an example of a 1D luminance image; and

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
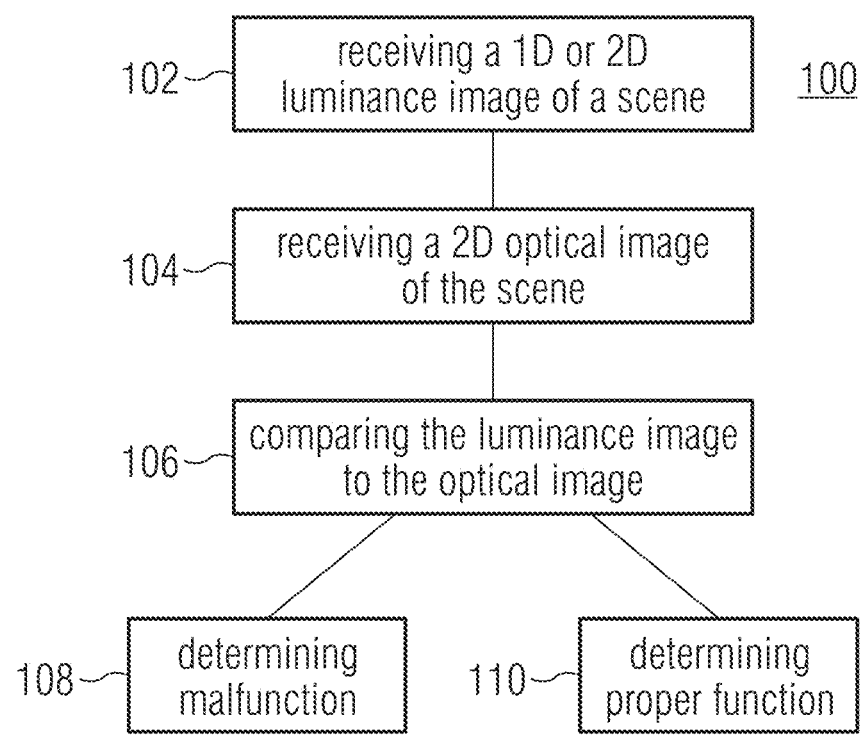
FIG. 1 illustrates a flowchart of an example of a method for determining malfunction.

FIG. 1 illustrates an example of a method 100 for determining malfunction in a sensor system comprising a ToF based 3D-camera (image sensor) and an optical 2D-camera (image sensor). The ToF based 3D-camera is a camera using the ToF principle to generate 3D image data such as a LiDAR camera (sensor). The optical 2D-camera is a camera capturing light of the visible spectrum to generate 2D image data (e.g. a still image or moving images). It is to be noted that the sensor system may in addition to the 3D-camera and the 2D-camera optionally comprise further sensors such as, e.g., a radar sensor.

The 3D-camera comprises an illumination element for illuminating the scene with modulated light (e.g. infrared light). The illumination element generates the modulated light based on a (electric) modulated radio frequency signal such as a continuous wave modulated signal (e.g. by controlling one or more Light-Emitting Diodes, LEDs, or one or more laser diodes based on the modulated signal). An object in the scene that is illuminated by the modulated light reflects at least part of the modulated light back to a light capturing element (e.g. comprising optics, an image sensor and driver electronics) of the ToF camera. In other words, the light capturing element receives reflected light from the object (together with background light from the scene).

The image sensor of the light capturing element is pixelated and each pixel measures a fraction of the reflected light. That is, the image sensor comprises one or more photo-sensitive elements for measuring the incoming light. For example, the image sensor may comprise a single photo-sensitive element, a 1D pixel array of photo-sensitive elements or a 2D pixel array of photo-sensitive elements. In other words, the one or more light-sensitive sensor elements may be arranged along one or two different (e.g. orthogonal) spatial directions. Accordingly, one or more (electric) measurement signals are generated based on the light received from the scene. For example, a light-sensitive sensor element may be a photo diode, an Avalanche Photo Diode (APD), a Single Photon Avalanche Diode (SPAD), or an array of SPADs as Silicon PhotoMultipliers (SiPM).

The distance of the object to the 3D-camera is calculated based on the ToF of the emitted light. The position of the object relative to the 3D-camera is determined by the emission angle of the emitted light and optionally by the view angle of the one or more photo-sensitive elements. Accordingly, the 3D-camera may output 3D image data of a scene.

The 2D-camera comprises an optical system to focus incoming light on an image sensor which is pixelated. That is, the image sensor of the 2D-camera comprises photo-sensitive elements for measuring the incoming light. For example, the photo-sensitive elements may be Charge-Coupled Devices (CCD) or active pixel sensor in Complementary Metal-Oxide-Semiconductor (CMOS) technology. A shutter mechanism controls the length of time that light can enter the 2D-camera. Accordingly, the 2D-camera may output 2D image data of a scene.

The 3D-camera as well as the 2D-camera may suffer from a variety of hardware faults causing malfunction of the camera. For example, obstacles and/or dirt may be present in an optical light path of the camera. Condensed humidity may be present at a cover (glass) through which light exits/enters the camera. Further, the cover (glass) may be broken. The light-sensitive sensor element(s), i.e. the light detector(s), of the camera may degrade (e.g. one or more APDs of the 3D-camera may degrade). The intended alignment of the 2D-camera and the 3D-camera with respect to each other may drift over time. In other words, the 2D-camera and the 3D-camera may be misaligned with respect to each other. Further, one or more internal error compensation mechanisms of the camera (e.g. DC current compensation) may drift over time. Also, a row and/or column decoder of the camera may fail. It is to be noted that the above list of potential hardware faults is exemplary and not limiting. The 3D-camera as well as the 2D-camera may similarly suffer from one or more other hardware faults not contained in the above list.

The above listed hardware faults may cause erroneous 3D image data of the 3D-camera and/or erroneous 2D image data of the 2D-camera. Further, if the 3D image data of the 3D-camera and the 2D image data of the 2D-camera are combined (fused), the above listed faults may cause erroneous combination (fusion) results. Erroneous 3D image data of the 3D-camera and/or erroneous 2D image data of the 2D-camera may reduce the safety of an entity using the sensor system. For example, if a vehicle uses the 3D-camera and the 2D-camera (optionally in combination with other sensors) to scan its environment, erroneous 3D image data of the 3D-camera or 2D image data of the 2D-camera may lead to an erroneous perception of the environment by the vehicle. Method 100 may allow to detect malfunction of the 3D-camera and the 2D-camera such that usage of erroneous 3D image data of the 3D-camera and/or erroneous 2D image data of the 2D-camera may be avoided.

Method 100 comprises receiving 102 a 1D or 2D luminance image of the scene from the ToF based 3D-camera. The luminance image comprises one or more pixels representing intensities of background light received by the image sensor of the 3D-camera. The background light is ambient light received by the image sensor of the 3D-camera from the sensed scene. That is, the one or more pixels of the luminance image indicate the amount of light that is received from the scene within a given solid angle for the respective pixel. In other words, the one or more pixels of the luminance image represent brightness information for the scene. The luminance image may be 1D or 2D image depending on the structure of the image sensor of the 3D-camera. For example, if the image sensor is a single photo-sensitive element or a 1D pixel array of photo-sensitive elements, the luminance image of the scene may be a 1D image. Alternatively, if the image sensor is a 2D pixel array of photo-sensitive elements, the luminance image of the scene may be 2D image.

Method 100 further comprises receiving 104 a 2D optical image of the scene from the optical 2D-camera. The 2D optical image is a 2D image comprising a plurality of pixels representing (e.g. only) color and/or luminance of light of the visible spectrum received by the image sensor of the 2D-camera. In some examples, the 2D optical image of the 2D-camera may be a luminance image.

Additionally, method 100 comprises comparing 106 the luminance image to the optical image. For example, the whole luminance image may be compared to the whole or part of the optical image. In other examples, part of the luminance image may be compared to the whole or part of the optical image. When comparing the luminance image to the optical image one or more properties of the 2D-camera and the 3D-camera may be taken into account in order to enable a proper comparison. For example, different resolutions of the luminance image and the optical image, intended Fields of View (FoVs) of the 2D-camera and the 3D-camera, and/or an intended alignment of the 2D-camera and the 3D-camera with respect to each other may be taken into account when comparing 106 the luminance image to the optical image.

If the luminance image does not match the optical image, method 100 additionally comprises determining 108 malfunction of one of the 3D-camera and the 2D-camera. If the luminance image matches the optical image, method 100 may comprise determining 110 proper function of the 3D-camera and the 2D-camera. "Matching" as used in the present disclosure means that parts of the luminance image and the optical which are to depict the same section of the scene represent equivalent information about the scene. That is, the luminance represented by a part of the luminance image depicting a given section of the scene is equivalent or corresponding to the luminance represented by a part of the optical image depicting the same section of the scene. If the luminance information in both images is not equivalent, the luminance image does not match the optical image. "Equivalent" or "corresponding" luminance as used in the present disclosure means that the luminance represented by corresponding parts of the luminance image and the optical image is (substantially) identical/similar or that the scaled luminance represented by one of the images is (substantially) identical/similar to the luminance represented by the other one of the images. Scaling may be used to compensate for different properties of the 3D-camera and the 2D-camera (e.g. structure, alignment, exposure time, etc.).

For example, comparing 106 the luminance image to the optical image may comprise selecting a first region of the luminance image and a second region of the optical image. When selecting the first region and the second region, it is assumed that the first region and the second region depict the same section of the scene. In other words, the first region of the luminance image and the second region of the optical image are to depict the same section of the scene. Further, comparing 106 the luminance image to the optical image may comprise determining a first luminance of the first region and determining a second luminance of the second region. The first luminance to the second luminance are compared. If the first luminance does not correspond to the second luminance (e.g. if the first luminance or the scaled first luminance is not equal to the second luminance), it is determined that the luminance image does not match the optical image. Taking into account that conventional optical 2D-cameras provide a higher resolution than ToF based 3D-cameras, the second region may comprise more pixels than the first region.

Malfunction of the 3D-camera leads to an erroneous luminance image, whereas malfunction of the 2D-camera leads to an erroneous optical image. Accordingly, the luminance image and the optical image do not match if one of the images is erroneous due malfunction of the respective camera. Comparing 106 the luminance image to the optical image may, hence, allow to detect faults of the 3D-camera or the 2D-camera. For example, method 100 may allow to detect faults in the optics, the pixels, the decoders and/or other elements of the optical to electrical conversion in the 3D-camera and the 2D-camera. Similarly, faults in the mechanical set-up of the cameras such as pointing error, tilt or focus issues may be detected by method 100. Any fast change or slow deterioration of the relevant parameters may be detected by the proposed method. In general, method 100 may be understood as a diverse technique enabling to continuously check the optical to electrical conversion of a 3D-camera or the optical path of the 3D-camera using a 2D-camera, and vice versa.

If malfunction of one of the 3D-camera and the 2D-camera is determined, method 100 may further comprise outputting an error signal indicating malfunction of one of the 3D-camera and the 2D-camera. For example, the error signal may be evaluated by an entity/system using the 3D image data of the 3D-camera and/or the 2D image data of the 2D-camera in order to determine whether the data of the 3D-camera and/or the 2D-camera are reliable/free from errors, i.e. determine whether the data of the 3D-camera and/or the 2D-camera should be further processed by the entity. For example, an entity combining (fusing) the data of the 3D-camera and/or the 2D-camera (optionally with data from further sensors) may decide to not use the data of the 3D-camera or the 2D-camera if the error signal indicates malfunction of one of the 3D-camera and the 2D-camera. In other examples, a warning may be output to a user via a Human-Machine Interface (HMI; e.g. a warning light may be activated or a warning tone to may be emitted) if the error signal indicates malfunction of one of the 3D-camera and the 2D-camera.

Conventional optical 2D-cameras provide a higher resolution than ToF based 3D-cameras. Accordingly, the resolution of the optical image may be higher than the resolution of the luminance image. Taking into account the different resolutions of the optical image and the luminance image may further allow to identify which of the 3D-camera and the 2D-camera is malfunctioning (faulty). Due to the different resolutions of the 2D-camera and the 3D-camera, the same section of the scene is represented by a greater number of pixels in the optical image than in the luminance image. If a plurality of pixels in the optical image depicting a given object in the scene represents a certain luminance and if fewer pixels in the luminance image, which are to depict the same object, represent a luminance that does not correspond to the luminance represented by the plurality of pixels in the optical image, one may assume that the 3D-camera is malfunctioning since it is more likely that the few pixels in the luminance image are faulty than the many pixels of the optical image. On the other hand, if the luminance varies between a plurality of pixels in the optical image depicting a given object in the scene and if fewer pixels in the luminance image, which are to depict the same object, represent a similar luminance, one may assume that the 2D-camera is malfunctioning due to the luminance variation.

In the following two exemplary sensor systems using LiDAR cameras as 3D-cameras will be described with reference to FIGS. 2 to 5. The proposed malfunction determination is used to verify functionality of the LiDAR camera.

Figure 2:
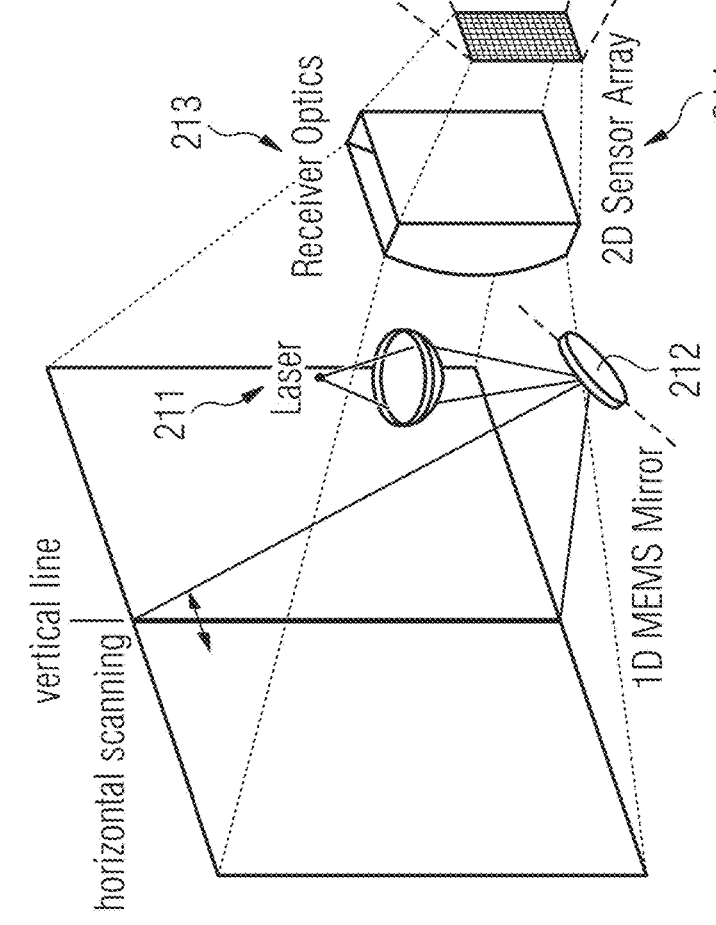
Figure 1:
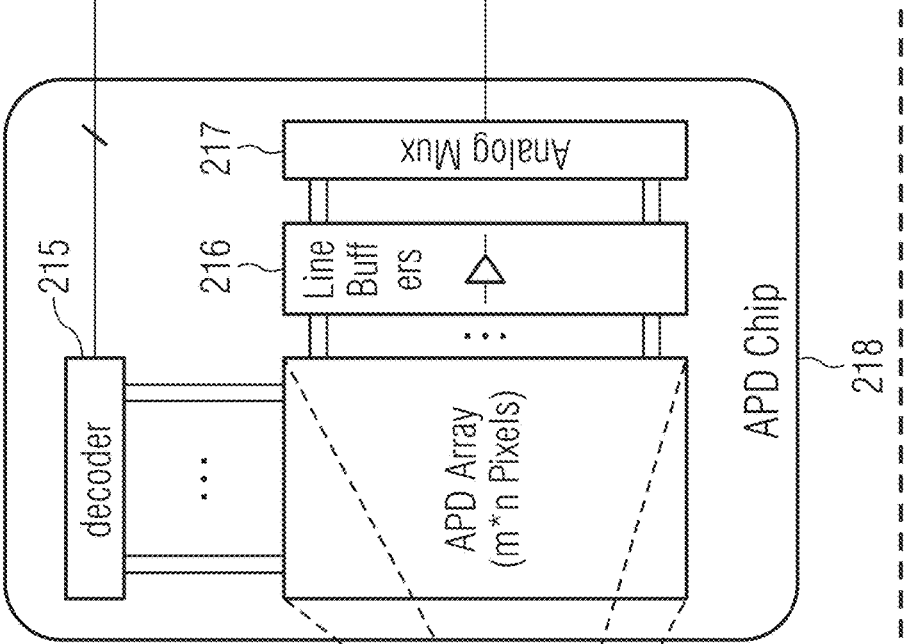
Figure 2:
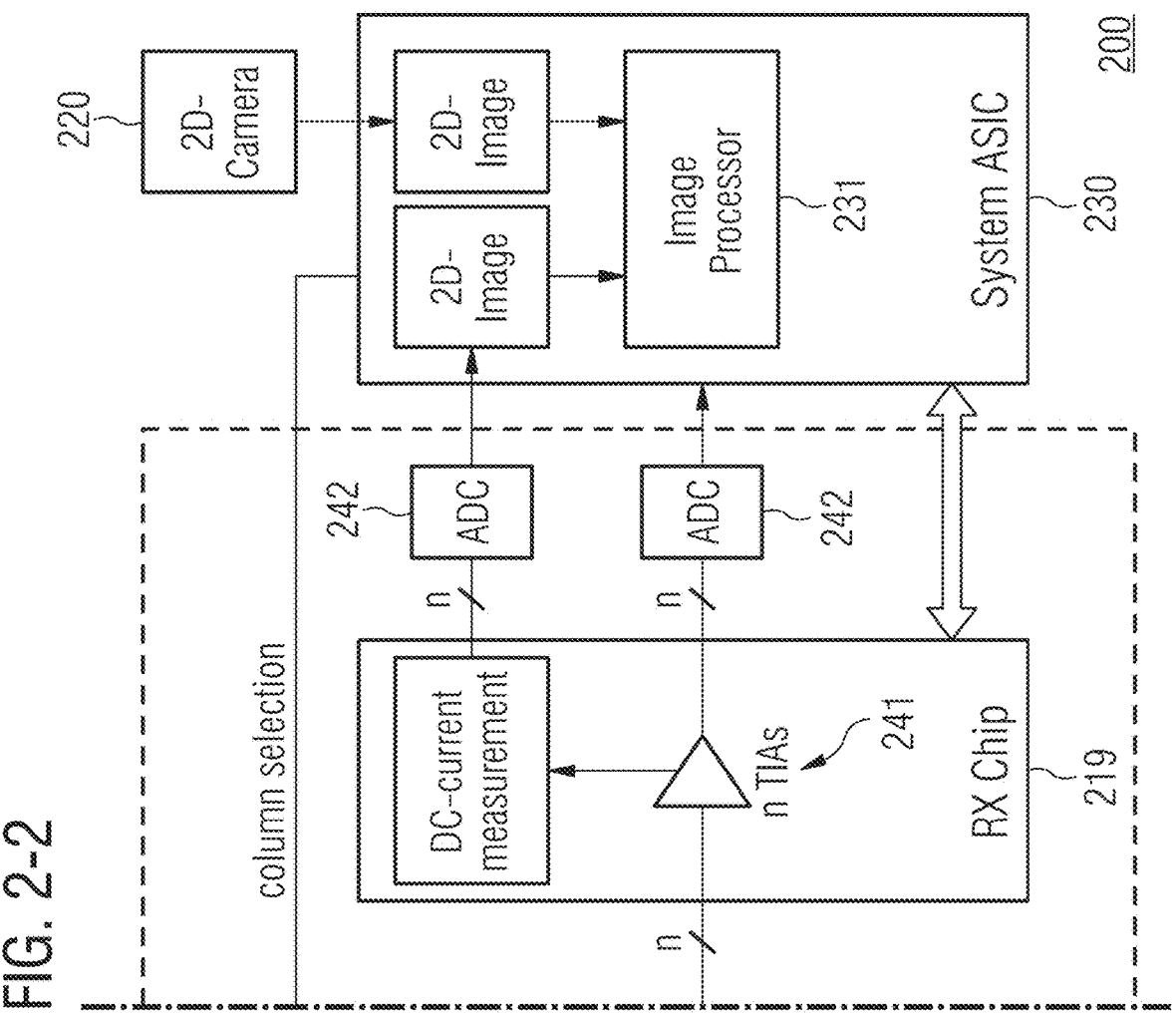

FIGS. 2-1 and 2-2 which make up FIG. 2 illustrates a sensor system 200 comprising a LiDAR camera 210 as an example for a ToF based 3D-camera, an optical 2D-camera 220 and an integrated circuit 230 for signal processing and overall control of the sensor system 200. In the example of FIG. 2, the integrated circuit 230 is an application specific integrated circuit (ASIC). However, it is to be noted that the integrated circuit 230 is not limited to this specific implementation.

The LiDAR camera 210 comprises a laser line source 211 and an oscillating mirror 212 (e.g. implemented in Micro-ElectroMechanical Systems, MEMS, technology) to emit line-shaped laser pulses to the environment for scanning the environment by means of the optical stimulus. As indicated in FIG. 2, the oscillatory movement of the oscillating mirror 212 enables horizontal scanning of the environment. Reflected light is projected by a receiver optics 213 onto a 2D image sensor 214 comprising a 2D pixel array of APDs (e.g. comprising m*n APD pixels). The 2D pixel array of APDs converts the optical signal (reflections of laser light+ background light) received from the environment into electrical signals. A decoder 215 is used to read-out the 2D pixel array of APDs columnwise. The decoder operation is controlled by the integrated circuit 230. The electrical signals read-out from the individual APDs are buffered in line buffers 216 and transmitted to a receiver chip 219 by means of an analog multiplexer 217. The 2D pixel array of APDs is implemented on an APD chip 218 together with the decoder 215, the line buffers 216 and the analog multiplexer 217. The n TransImpedance Amplifiers (TIAs) 241 of the receiver chip 219 for the n APDs per column amplify and filter the electrical signals. Subsequently, the filtered and amplified electrical signals are converted by means of Analog-to-Digital Converter (ADC) 242 to digital signals. The digital signals represent 3D image data of the environment and are supplied to an image processor 231 of the integrated circuit 230.

The DC currents of the individual APD pixels are proportional to the received background light. The DC currents are measured via the TIAs 241 and converted into digital signals by means of ADC 242. The digital signals representing the DC currents, i.e. the digitized DC information, is communicated to the integrated circuit 230 as 2D luminance image. Further, an optical 2D image of the environment is provided to the integrated circuit 230 by the optical 2D-camera 220.

By comparing the 2D luminance image of the 3D LiDAR camera 210 and the 2D optical image from the 2D-camera, the image processor 231 determines whether the LiDAR camera 210 is functioning properly. For example, the proposed image matching may allow to verify whether the 2D array of APDs is functioning properly. As described above, if the 2D luminance image of the 3D LiDAR camera 210 does not match the 2D optical image from the 2D-camera, the integrated circuit 230 may determine malfunction of the LiDAR camera 210.

Figure 3:
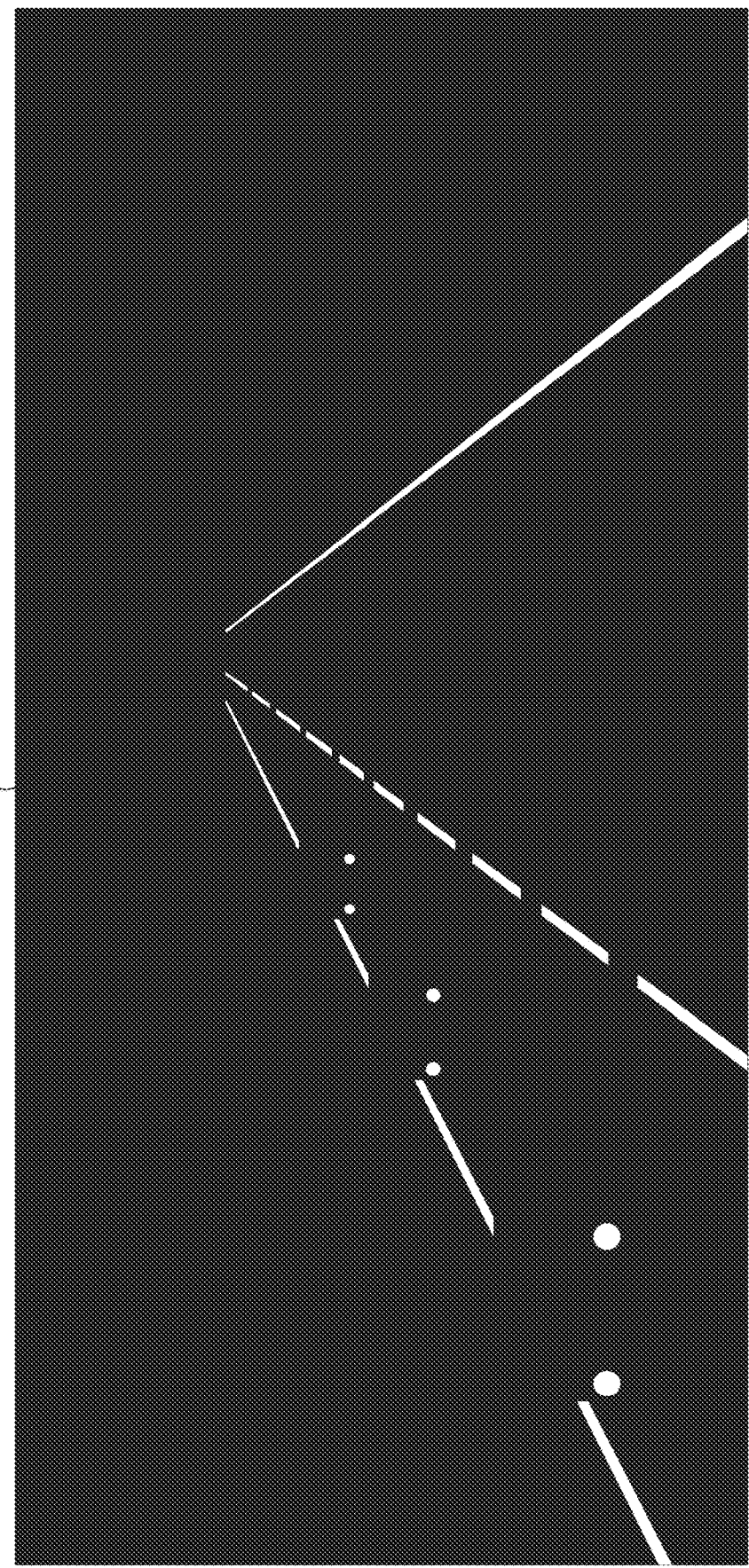
FIG. 3 illustrates an example of a 2D luminance image.

An exemplary 2D luminance image 300 of a FoV seen by the LiDAR camera 210 is illustrated in FIG. 3. The scene depicted in FIG. 3 is a road at night. In the luminance image 300, the headlights of three approaching cars as well as the road marking are visible. For example, the luminance of one or more pixels representing one of the headlights or one of the road markings may be compared to the luminance of the pixels in the optical which are to represent the same object of the scene in accordance with the above explanations.

Figures 1, 4:
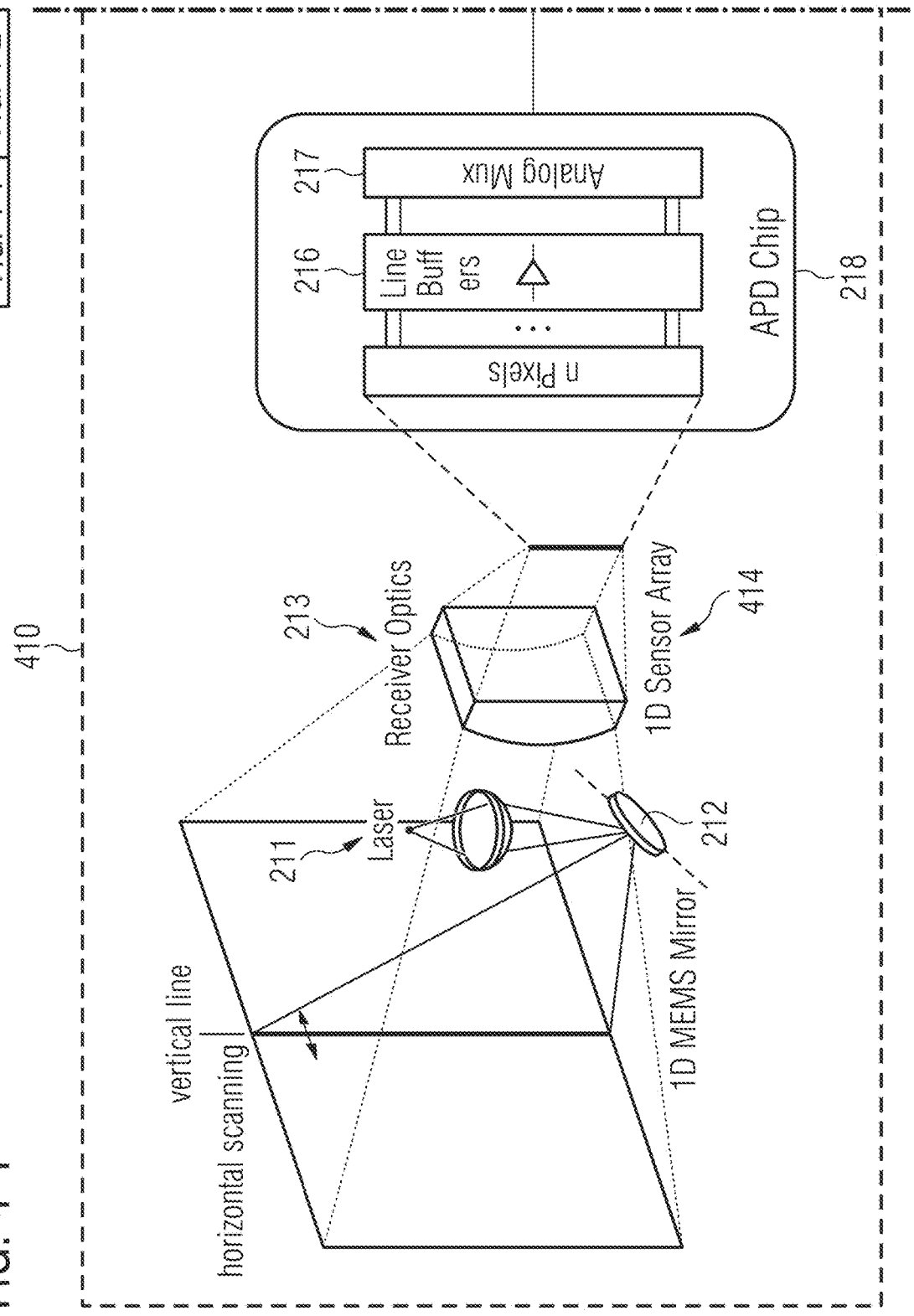
Figures 2, 4:
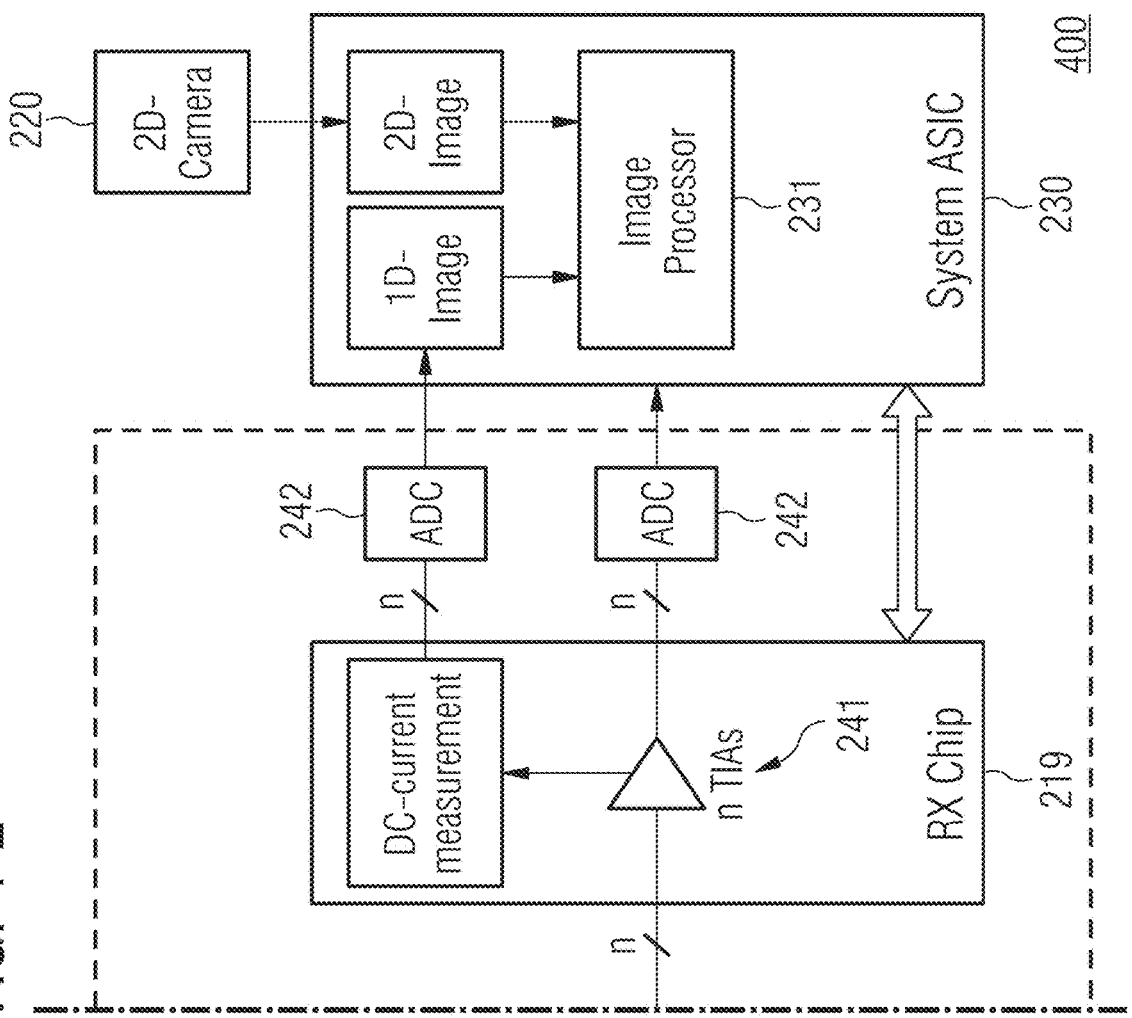

FIGS. 4-1 and 4-2 which make up FIG. 4 illustrates another sensor system 400 which is similar to sensor system 200 described above. In contrast to sensor system 200, the LiDAR camera 410 of the sensor system 400 uses a 1D image sensor 414 comprising a 1D pixel array of APDs instead of the 2D image sensor 214. Therefore, the decoder 215 may be omitted in the LiDAR camera 410 compared to the LiDAR camera 210. In the example of FIG. 4, one APD pixel collects the background light of the entire horizontal field but only over a small vertical angle.

The electrical signals of the APDs are read-out by line buffers 216 similar to what is described above for the sensor system 200. The signal processing and the malfunction detection is done equivalently to what is described above for the sensor system 200.

An exemplary 1D luminance image 500 of the same scene as depicted in FIG. 3 is illustrated in FIG. 5. The n vertical lines of luminance image 500 represent the luminance intensities measured by the n APD pixels of the LiDAR camera 410. When comparing the 1D luminance image 500 to the 2D luminance image 300, one can see that the three high luminance intensities 510, 520 and 530 in 1D luminance image 500 represent the headlights of the three approaching cars (and the road marking), whereas the other low luminance intensities represent only the road marking. Similarly to what is described in connection with the 2D luminance image 300, the luminance of a pixel of the 1D luminance image 500 representing one of the headlights (or one or the road markings) may be compared to the luminance of the pixels in the optical which are to represent the same object of the scene in order to determine malfunction of the LiDAR camera 410.

That is, irrespective whether the luminance image is a 1D image or a 2D image, relevant features for comparison to the 2D image of the 2D-camera may be extracted.

Summarizing the examples described above in connection with FIGS. 2 to 5, the proposed method may comprise measuring a DC current of the at least one photo-sensitive element of the 3D-camera in order to obtain at least one measurement value for the DC current of the at least one photo-sensitive element, and generating the luminance image based on the at least one measurement value.

In alternative examples, a voltage of the photo-sensitive element(s) may be measured instead of a current. Depending on the implementation of the 3D-camera's photo-sensitive element(s), a voltage of the photo-sensitive element(s) may indicate the intensity of the received background light for the respective photo-sensitive element. Therefore, the proposed method may alternatively comprise measuring a voltage of the at least one photo-sensitive element of the 3D-camera (e.g. a DC voltage) to obtain at least one measurement value for the voltage of the at least one photo-sensitive element, and generating the luminance image based on the at least one measurement value.

As described above, the at least one measurement value for the current or the voltage of the at least one photo-sensitive element may be an analog measurement value. The proposed method may then further comprise generating at least one digital measurement value based on the at least one analog measurement value, wherein the luminance image is generated based on the at least one digital measurement value.

By providing the background light (luminance) image generated by a 3D-light sensor and comparing it with the image generated by a 2D-camera, detection of faults in the optical path and in the light-to-electrical signal-converters (pixels) may be enabled.

Figure 6:
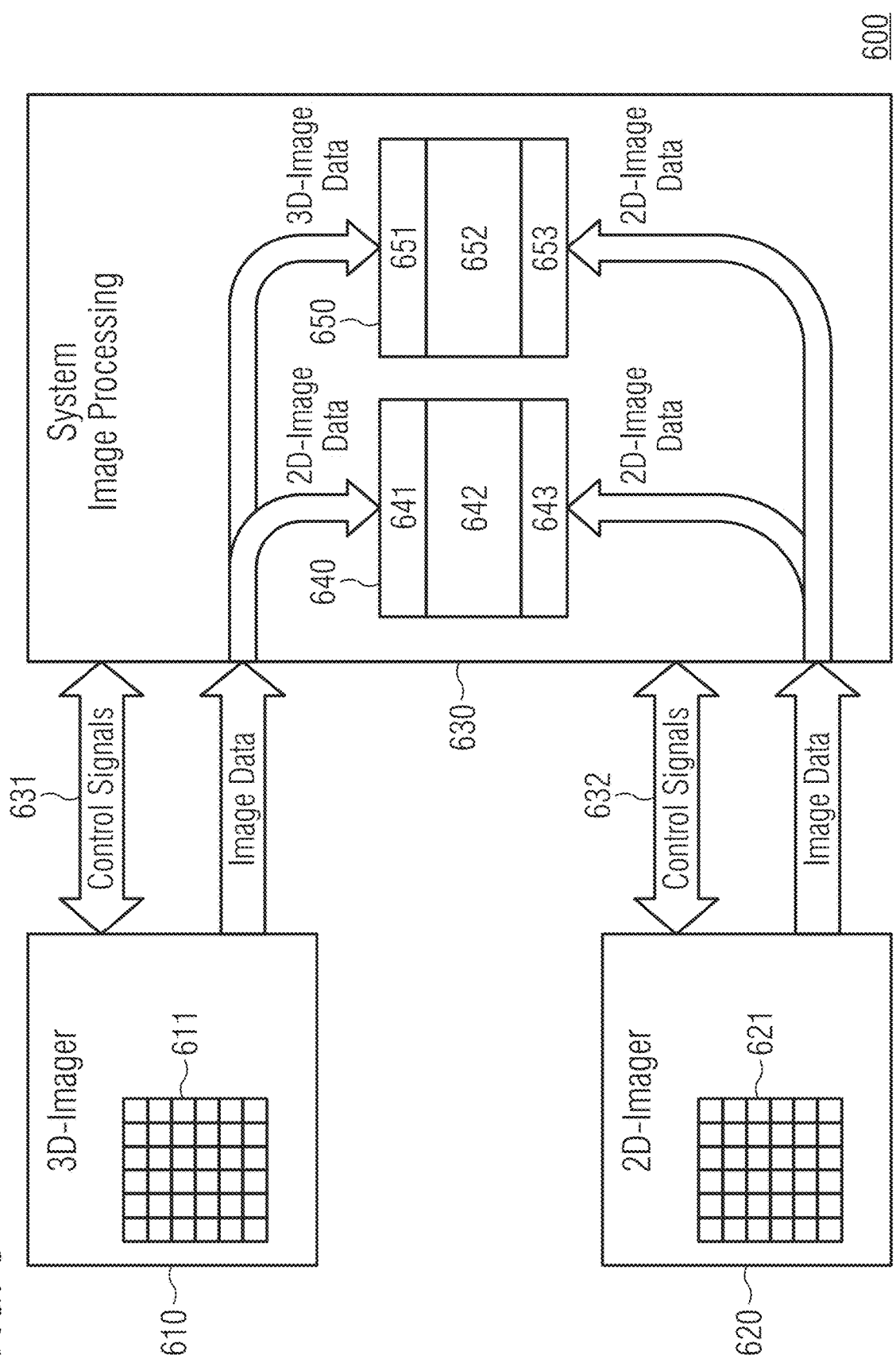
FIG. 6 illustrates a further example of a sensor system.

FIG. 6 illustrates another sensor system 600. The sensor system 600 comprises a ToF based 3D-camera 610 and an optical 2D-camera 620. Further, the sensor system 600 comprises an integrated circuit 630 which controls the cameras and implements the functionality of an apparatus 640 for determining malfunction as proposed as well as the functionality of an apparatus 650 for fusing images of the 3D-camera 610 and the 2D-camera 620. For example, the integrated circuit 630 may be a single dedicated processor, a single shared processor, or a plurality of individual processors, some of which or all of which may be shared, a digital signal processor (DSP) hardware, ASIC or a field programmable gate array (FPGA). The integrated circuit 630 may optionally be coupled to, e.g., read only memory (ROM) for storing software, random access memory (RAM) and/or non-volatile memory. The sensor system 600 may further comprise other hardware—conventional and/or custom (e.g. another sensor such as a radar sensor).

The integrated circuit 630 controls operation of the 3D-camera 610 and the 2D-camera 620 by means of respective (e.g. bidirectional) control signals 631 and 632. As indicated in FIG. 6, image sensors 611, 621 of the 3D-camera 610 and the 2D-camera 620 may comprise a respective 2D pixel array of photo-sensitive elements. However, it is to be noted that the image sensor 611's 2D pixel array of photo-sensitive elements 611 is merely exemplary and that the image sensor 611 may alternatively comprise a single photo-sensitive element or a 1D pixel array of photo-sensitive elements.

The apparatus 640 for determining malfunction comprises a first input interface 641 configured to receive input data representing a 2D (or alternatively a 1D) luminance image of a scene from the 3D-camera 610. As described above in detail, the luminance image comprises one or more pixels representing intensities of background light received by the image sensor 611 of the 3D-camera 610. The apparatus 640 for determining malfunction further comprises a second input 643 interface configured to receive input data representing a 2D optical image of the scene from the 2D-camera 620. Additionally, the apparatus 640 for determining malfunction comprises a processing circuit 642 configured to compare the luminance image to the optical image, and to determine malfunction of one of the 3D-camera 610 and the 2D-camera 620 if the luminance image does not match the optical image.

The apparatus 650 for fusing images of the 3D-camera 610 and the 2D-camera 620 comprises a first input interface 651 configured to receive input data representing a 3D image of the scene from the 3D-camera 610. The apparatus 650 for fusing images of the 3D-camera 610 and the 2D-camera 620 further comprises a second input interface 653 configured to receive input data representing the 2D optical image of the scene from the 2D-camera 620. Additionally, the apparatus 650 for fusing images of the 3D-camera 610 and the 2D-camera 620 comprises a processing circuit 652 configured to fuse the 3D image and the 2D optical image to a combined image of the scene.

The 2D image of the 2D-camera 620 (e.g. a luminance image) may exhibit a highest resolution, whereas the 3D image of the 3D-camera 610 may exhibit a lower resolution. By comparing the 2D image of the 2D-camera 620 and the 3D image of the 3D-camera 610 (and optionally further images such as a distance image or a speed image provided by a radar sensor at low resolution) and further checking the images for validity, a 2D or 3D model of the scene/environment may be generated.

By generating the 1D or 2D luminance image from the ToF based 3D-camera 610 and directly comparing it to the 2D (e.g. luminance) image of the 2D-camera, efficient fault detection may be enabled. Accordingly, functional safety may be achieved in an easy and cheap manner for various applications (e.g. automotive applications). In other words, the sensor system 600 may enable functional safety and sensor fusion for a ToF based 3D-camera (e.g. a LiDAR camera).

The examples as described herein may be summarized as follows:

Some examples relate to a method for determining malfunction. The method comprises receiving a 1D or 2D luminance image of a scene from a ToF based 3D-camera. The luminance image comprises one or more pixels representing intensities of background light received by an image sensor of the 3D-camera. The method further comprises receiving a 2D optical image of the scene from an optical 2D-camera and comparing the luminance image to the optical image. If the luminance image does not match the optical image, the method additionally comprises determining malfunction of one of the 3D-camera and the 2D-camera.

In some examples, the image sensor is a single photo-sensitive element or a 1D pixel array of photo-sensitive elements, and wherein the luminance image of the scene is 1D.

In alternative examples, the image sensor is a 2D pixel array of photo-sensitive elements, and wherein the luminance image of the scene is 2D.

According to some examples, a resolution of the optical image is higher than a resolution of the luminance image.

In some examples, the image sensor comprises at least one photo-sensitive element, and wherein the method further comprises: measuring a DC current of the at least one photo-sensitive element to obtain at least one measurement value for the DC current of the at least one photo-sensitive element; and generating the luminance image based on the at least one measurement value.

In alternative examples, the image sensor comprises at least one photo-sensitive element, and wherein the method further comprises: measuring a voltage of the at least one photo-sensitive element to obtain at least one measurement value for the voltage of the at least one photo-sensitive element; and generating the luminance image based on the at least one measurement value.

According to some examples, the at least one measurement value is an analog measurement value, wherein the method further comprises generating at least one digital measurement value based on the at least one analog measurement value, and wherein the luminance image is generated based on the at least one digital measurement value.

In some examples, comparing the luminance image to the optical image is performed taking into account at least one of the following properties: different resolutions of the luminance image and the optical image, intended fields of view of the 2D-camera and the 3D-camera, and intended alignment of the 2D-camera and the 3D-camera with respect to each other.

According to some examples, comparing the luminance image to the optical image comprises: selecting a first region of the luminance image and a second region of the optical image, wherein it is assumed that the first region and the second region depict the same section of the scene; determining a first luminance of the first region; determining a second luminance of the second region; comparing the first luminance to the second luminance; and determining that the luminance image does not match the optical image if the first luminance does not correspond to the second luminance.

In some examples, the second region comprises more pixels than the first region.

According to some examples, the method further comprises outputting an error signal indicating malfunction of one of the 3D-camera and the 2D-camera if malfunction of one of the 3D-camera and the 2D-camera is determined.

Other examples relate to an apparatus for determining malfunction. The apparatus comprises a first input interface configured to receive a 1D or 2D luminance image of a scene from a ToF based 3D-camera. The luminance image comprises one or more pixels representing intensities of background light received by an image sensor of the 3D-camera. The apparatus further comprises a second input interface configured to receive a 2D optical image of the scene from an optical 2D-camera. Additionally, the apparatus comprises a processing circuit configured to compare the luminance image to the optical image, and to determine malfunction of one of the 3D-camera and the 2D-camera if the luminance image does not match the optical image.

Further examples relate to a sensor system. The sensor system comprises a ToF based 3D-camera and an optical 2D-camera. Further, the sensor system comprises an apparatus for determining malfunction as described herein. The sensor system additionally comprises an apparatus for fusing images of the 3D-camera and the 2D-camera. The apparatus for fusing images of the 3D-camera and the 2D-camera comprises a first input interface configured to receive a 3D image of the scene from the 3D-camera and a second input interface configured to receive the 2D optical image of the scene from the 2D-camera. Additionally, the apparatus for fusing images of the 3D-camera and the 2D-camera comprises a processing circuit configured to fuse the 3D image and the 2D optical image to a combined image of the scene.

Still further examples relate to another apparatus for determining malfunction. The apparatus comprises means for receiving a 1D or 2D luminance image of a scene from a ToF based 3D-camera. The luminance image comprises one or more pixels representing intensities of background light received by an image sensor of the 3D-camera. The apparatus further comprises means for receiving a 2D optical image of the scene from an optical 2D-camera. Additionally, the apparatus comprises means for comparing the luminance image to the optical image. Further, the apparatus comprises means for determining malfunction of one of the 3D-camera and the 2D-camera if the luminance image does not match the optical image.

Examples relate to a non-transitory machine readable medium having stored thereon a program having a program code for performing the method for determining malfunction as described herein, when the program is executed on a processor or a programmable hardware.

Other examples relate to a program having a program code for performing the method for determining malfunction as described herein, when the program is executed on a processor or a programmable hardware.

Examples according to the proposed concept may allow to detect and control random hardware faults in the light to electrical signal conversion of a ToF system or an optical camera.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining malfunction, the method comprising:
    receiving a luminance image of a scene from a time-of-flight based 3D-camera, wherein the luminance image is a 1D or 2D luminance image that comprises one or more pixels representing intensities of background light received by an image sensor of the time-of-flight based 3D-camera;
    receiving a 2D optical image of the scene from an optical 2D-camera;
    selecting a first region of the luminance image corresponding to a section of the scene, wherein the first region of the luminance image has a first number of pixels;
    selecting a second region of the 2D optical image corresponding to the section of the scene, wherein the second region of the 2D optical image has a second number of pixels greater than the first number of pixels;
    comparing the luminance image to the 2D optical image, including comparing first luminance information extracted from the luminance image with second luminance information extracted from the 2D optical image;
    detecting a malfunction of one of the time-of-flight based 3D-camera and the optical 2D-camera on a condition that the first luminance information extracted from the luminance image does not match the second luminance information extracted from the 2D optical image;
    evaluating a luminance variation of the second region of the 2D optical image based on the second luminance information, on a condition the luminance variation does not satisfy a threshold, determining that the malfunction corresponds to the time-of-flight based 3D-camera; and on a condition the luminance variation does satisfy the threshold, determining that the malfunction corresponds to the optical 2D-camera.

2. The method of claim 1, wherein:

the image sensor comprises a single photo-sensitive element or a 1D pixel array of photo-sensitive elements, and the luminance image of the scene is 1D.

3. The method of claim 1, wherein:

the image sensor is a 2D pixel array of photo-sensitive elements, and the luminance image of the scene is 2D.

4. The method of claim 1, wherein a resolution of the 2D optical image is greater than a resolution of the luminance image.

5. The method of claim 1, wherein the image sensor comprises at least one photo-sensitive element, and wherein the method further comprises:

measuring a DC current of the at least one photo-sensitive element to obtain at least one measurement value for the DC current of the at least one photo-sensitive element; and generating the luminance image based on the at least one measurement value.

6. The method of claim 5, wherein:

the at least one measurement value is an analog measurement value, and the method further comprises generating at least one digital measurement value based on the at least one measurement value, and wherein the luminance image is generated based on the at least one digital measurement value.

7. The method of claim 1, wherein the image sensor comprises at least one photo-sensitive element, and wherein the method further comprises:

measuring a voltage of the at least one photo-sensitive element to obtain at least one measurement value for the voltage of the at least one photo-sensitive element; and generating the luminance image based on the at least one measurement value.

8. The method of claim 7, wherein:

the at least one measurement value is an analog measurement value, and the method further comprises generating at least one digital measurement value based on the at least one measurement value, and wherein the luminance image is generated based on the at least one digital measurement value.

9. The method of claim 1, wherein comparing the luminance image to the 2D optical image is performed taking into account at least one of the following properties:

different resolutions of the luminance image and the 2D optical image, intended fields of view of the optical 2D-camera and the time-of-flight based 3D-camera, and intended alignment of the optical 2D-camera and the time-of-flight based 3D-camera with respect to each other.

10. The method of claim 1, wherein comparing the luminance image to the 2D optical image comprises:

determining a first luminance of the first region of the luminance image as the first luminance information;

determining a second luminance of the second region of the 2D optical image as the second luminance information;

comparing the first luminance to the second luminance; and determining that the luminance image does not match the 2D optical image if the first luminance does not correspond to the second luminance.

11. The method of claim 1, further comprising:

outputting an error signal indicating the detected malfunction of one of the time-of-flight based 3D-camera and the optical 2D-camera on a condition the malfunction of one of the time-of-flight based 3D-camera and the optical 2D-camera is determined.

12. The method of claim 1, further comprising:

if a luminance of the second region of the 2D optical image is substantially constant, determining that the malfunction corresponds to the time-of-flight based 3D-camera; and if the luminance of the second region of the 2D optical image varies, determining that the malfunction corresponds to the optical 2D-camera.

13. The method of claim 1, further comprising:

evaluating a first luminance variation of the first region of the luminance image based on the first luminance information, wherein the luminance variation of the second region of the 2D optical image is a second luminance variation, wherein the method further comprises:

if a luminance of the second region of the 2D optical image is substantially constant at a first constant luminance value, and if a luminance of the first region of the luminance image is different than the first constant luminance value, determining that the malfunction corresponds to the time-of-flight based 3D-camera; and if the luminance of the second region of the 2D optical image varies and the luminance of the first region of the luminance image is substantially constant at a second constant luminance value, determining that the malfunction corresponds to the optical 2D-camera.

14. The method of claim 13, wherein the first region and the second region correspond to a same object in the scene.

15. The method of claim 13, wherein the luminance image and the 2D optical image depict a same object in the scene.

16. An apparatus for determining malfunction, the apparatus comprising:

a first input interface configured to receive a luminance image of a scene from a time-of-flight based 3D-camera, wherein the luminance image is a 1D or 2D luminance image that comprises one or more pixels representing intensities of background light received by an image sensor of the time-of-flight based 3D-camera;

a second input interface configured to receive a 2D optical image of the scene from an optical 2D-camera; and a processing circuit configured to:

select a first region of the luminance image corresponding to a section of the scene, wherein the first region of the luminance image has a first number of pixels;

select a second region of the 2D optical image corresponding to the section of the scene, wherein the second region of the 2D optical image has a second number of pixels greater than the first number of pixels;

determine a first luminance of the luminance image;

determined a second luminance of the 2D optical image;

compare the first luminance to the second luminance;

detect a malfunction of one of the time-of-flight based 3D-camera and the optical 2D-camera on a condition that the first luminance does not correspond to the second luminance;

evaluate a first luminance variation of the first region of the luminance image;

evaluate a second luminance variation of the second region of the 2D optical image;

if a luminance of the second region of the 2D optical image is substantially constant at a first constant luminance value, and if a luminance of the first region of the luminance image is different than the first constant luminance value, determining that the malfunction corresponds to the time-of-flight based 3D-camera; and if the luminance of the second region of the 2D optical image varies and the luminance of the first region of the luminance image is substantially constant at a second constant luminance value, determining that the malfunction corresponds to the optical 2D-camera.

17. The apparatus of claim 16, wherein the processing circuit is configured to:

determine a luminance of the first region of the luminance image for use as the first luminance, and determine a luminance of the second region of the 2D optical image for use as the second luminance.

18. A sensor system, comprising:

a time-of-flight based 3D-camera;

an optical 2D-camera;

a malfunction detection apparatus comprising:

a first input interface configured to receive a luminance image of a scene from a time-of-flight based 3D-camera, wherein the luminance image is a 1D or 2D luminance image that comprises one or more pixels representing intensities of background light received by an image sensor of the time-of-flight based 3D-camera;

a second input interface configured to receive a 2D optical image of the scene from an optical 2D-camera; and a first processing circuit configured to determine a first luminance of the luminance image, determine a second luminance of the 2D optical image, compare the first luminance to the second luminance, and detect a malfunction of one of the time-of-flight based 3D-camera and the optical 2D-camera on a condition that the first luminance does not match the second luminance; and a fusing apparatus configured to fuse images of the time-of-flight based 3D-camera and the optical 2D-camera on a condition that the first luminance matches the second luminance, the fusing apparatus comprising:

a third input interface configured to receive a 3D image of the scene from the time-of-flight based 3D-camera;

a fourth input interface configured to receive the 2D optical image of the scene from the optical 2D-camera; and a second processing circuit configured to fuse the 3D image and the 2D optical image to generate a combined image of the scene on the condition that the first luminance matches the second luminance, wherein the first processing circuit is further configured to:

select a first region of the luminance image corresponding to a section of the scene, wherein the first region of the luminance image has a first number of pixels, select a second region of the 2D optical image corresponding to the section of the scene, wherein the second region of the 2D optical image has a second number of pixels greater than the first number of pixels, evaluate a first luminance variation of the first region of the luminance image, evaluate a second luminance variation of the second region of the 2D optical image, if a luminance of the second region of the 2D optical image is substantially constant at a first constant luminance value, and if a luminance of the first region of the luminance image is different than the first constant luminance value, determining that the malfunction corresponds to the time-of-flight based 3D-camera, and if the luminance of the second region of the 2D optical image varies and the luminance of the first region of the luminance image is substantially constant at a second constant luminance value, determining that the malfunction corresponds to the optical 2D-camera.

19. The sensor system of claim 18, wherein the first processing circuit is configured to:

determine a luminance of the first region of the luminance image for use as the first luminance, and determine a luminance of the second region of the 2D optical image for use as the second luminance.

* * * * *